Figure 1:
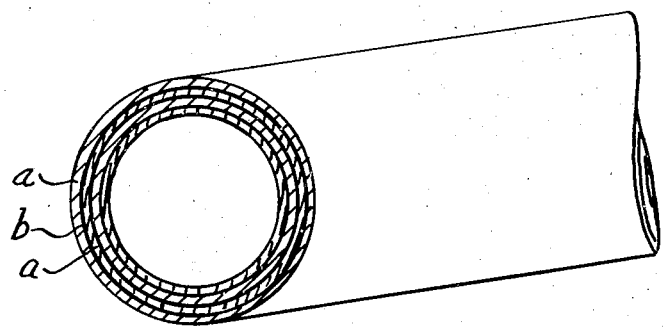

April 6, 1937.   A. GAMS ET AL   2,076,456

LAMINATED MATERIAL AND PROCESS OF MAKING SAME

Filed April 25, 1933

Inventors:
A. Gams
K. Frey and
T. Sutter,
by R. F. Neuberth
Att'y.

Patented Apr. 6, 1937

2,076,456

UNITED STATES PATENT OFFICE 2,076,456

LAMINATED MATERIAL AND PROCESS OF MAKING SAME

Alphonse Gams, Karl Frey, and Theodor Sutter, Basel, Switzerland, assignors to Society of Chemical Industry in Basle, Basel, Switzerland Application April 25, 1933, Serial No. 667,890
In Switzerland April 27, 1932

2 Claims. (Cl. 154—2)

The present invention relates to laminated rolled products from sheet-like material and a binding agent by the application of heat and pressure, wherein the binding agent is a fusible non-hardening amine resin selected from the group of anhydro-aminobenzyl-alcohol and its homologues and polymers. The invention comprises the manufacture of said products, for instance tubes, cylinders of different shape, bushings and the like, with or without interspersed metal sheets, and these products themselves as well as their use in the industry, especially in the electric industry.

The development of the electrical art has given rise to electric machinery in increasingly larger units and to increasingly larger tensions, so that the demand for electrical insulation, particularly laminated products of very high insulating capacity, also increases. Most of the synthetic resins capable of being hardened which are applicable as insulaton materals, suffer more or less from the disadvantage that as condensation progresses volatile products, such as water and ammonia, are developed with the result that the dielectric strength decreases, and in many cases the insulator may be cracked or even completely destroyed. Even in the case of resins which harden only by polymerization (such resins do not at present play a part in the art) there may be expected strains, shrinkages and a destruction of homogeneity due to differences in the progress of polymerization of different parts. As a non-hardening binding agent, only shellac has been hitherto available practically, but its use is limited by its low melting point.

The thermo-plastic resins which are made from primary aromatic amines with more than an equimolecular proportion of formaldehyde or formaldehyde yielding substances in an acid medium and the subsequent precipitation by means of an agent which eliminates the effect of the acid and the use of which for making molded bodies of all kinds, particularly for making laminated bodies of good mechanical and electrical properties, have been described in specifications Ser. Nos. 245,039 and 398,268, the latter now having issued February 18, 1936 as Patent 2,031,260. These are not particularly applicable for rolled articles, such as tubes, bushings etc., since the necessary pressure and temperature can be obtained only with difficulty on the usual rolling machines. The soluble and fusible resins which are obtained, without or with only a small proportion of acid, from primary aromatic amines and formaldehyde have in general too low a melting point, and, what is more important, are not sufficiently adhesive to permit the satisfactory union with webs of paper or woven fabric. The same defect exists in the fusible resins described in specification Ser. No. 400,156, now Patent 1,999,-093, dated April 23, 1935 which are produced by melting insoluble and infusible amine resins with substances capable of forming resins.

According to the present invention the fusible resins of the type of the anhydroaminobenzyl alcohol and its homologues and polymers, unlike all other fusible resins of the anilineformaldehyde type which have been investigated, are used with surprisingly good success as binding agents between the single sheets of supporting materials for laminated boards, rolled tubes and the like.

They may be applied in very simple manner to supports, soften quickly when heated and have a surprisingly good stickiness and adhesiveness. Since they are stable under the conditions which are employed in operation and do not suffer either condensation or polymerization under such conditions, there can be obtained from them a laminated product of remarkable homogeneity which requires no subsequent baking, and in consequence of the comparatively high melting point of the resin has a sufficient resistance to heat.

Resins of this type can be made in various ways, such as by condensation of a primary aromatic amine with about 1 mol. formaldehyde in the presence of at least ¼ mol. of an acid for instance hydrochloric acid, sulfuric acid, acetic acid and the like, with the subsequent elimination of the acid, or by transforming anhydroformaldehyde-aniline or its homologues by means of acid, for instance hydrochloric acid or glacial acetic acid, and eliminating the acid; or by anhydrization or condensation of aminobenzyl-alcohol which is obtainable by reducing nitrobenzyl-alcohol, for instance with zinc dust. The products obtainable by these methods are not exactly identical; for instance, the melting point may vary according to the conditions of reaction. All the products, however, have reactions in common. Thus they may be transformed by means of aniline hydrochloride into diaminodiphenyl-methane and form thiazole derivatives with sulfur. These compounds are not characterized by fixation of exactly 1 mol. of formaldehyde used in the manufacture. For example, even with 0.8 mol. of formaldehyde to 1 mol. of aniline-hydrochloride, there may be produced at a low temperature and in a relatively short time a resin of this kind, 0.2 mol. of aniline being left uncombined. On the other hand, a smaller excess of formaldehyde, up to about 10 per cent. above the equimolecular proportion under favorable conditions still may give rise to fusible resins which undoubtedly belong to this group. The melting point may vary by 100 to 200° C. according to the mode of manufacture.

The resins may be applied to the supporting materials, for example by sprinkling them on the heated support, or by applying the molten resin, or by dissolving the resin in a suitable solvent, such as cyclohexanone or chlorhydrin, and painting or spraying the solution. Further, an aqueous suspension of resin can be applied to the support in known manner and there fixed by the elimination of the acid, as for instance according to specification Ser. No. 582,644. One may also start from a paper made in known manner from a fibrous material mixed with amine resin (compare specifications Ser. Nos. 398,268 and 569,540), now Patents 2,031,260 and 2,041,330, respectively and coat such paper with a layer of a fusible amine resin of the type of the anhydroaminobenzyl-alcohol. Such sheets are especially adapted for the manufacture of dense, laminated rolled products.

Figure 2:
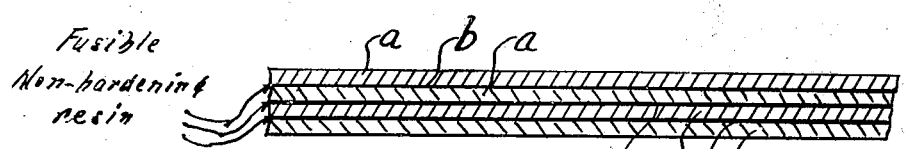

The accompanying sheet of drawing illustrates several exemplary embodiments of products obtainable according to this invention. On the said sheet of drawing, Fig. 1 is a perspective view of a tube made according to the invention; and Fig. 2 is a sectional view through laminated sheet material from which the tube of Fig. 1 may be made.

On the said figures of drawing, reference characters $a$ represent the several layers of sheet material from which the final products are built up, and reference characters $b$ designate the interposed resin layers according to the present invention.

The following example illustrates the invention, the parts being by weight:—

93 parts of aniline (1 mol.) are dissolved in 730 parts of hydrochloric acid (1 mol.) of 5 per cent. strength. To this solution which may have a temperature of about 25° C., there are added 83.5 parts of formaldehyde of 36 per cent. strength by weight (1 mol.). In the course of some minutes the mixture becomes deep red and the temperature rises to about 40° C. After 15 minutes from the start of the condensation, the solution is entered, preferably while stirring well, into 1050 parts of caustic soda solution of 4 per cent. strength, whereby the condensation product viz. polymer anhydroaminobenzylalcohol is obtained in the form of an almost white, flocculent precipitate. After the precipitation has taken place, the product obtained is advantageously heated to about 60° C. for some time, whereby the washing of the precipitate is facilitated. The washing procedure may be performed on a suction filter. In the case of larger charges it is more advantageous to effect the washing in automatic washing devices, the counter current system of decantation according to Dorr being for instance very suitable. After the washing has been continued until the precipitate is free from electrolytes, the latter is separated from the bulk of remaining liquor, dried and ground. In this manner a yellow powder is obtained which at about 130° C. liquefies to a brown melt. By suitable devices, for instance by a sprinkling machine, the powder is applied as evenly as possible in a thin layer on paper webs or textile webs. The webs thus sprinkled with a thin layer of powder are led through heated channels or conducted around heated drying cylinders, whereby the resinous powder is brought to melting and then forms a homogeneous layer which firmly adheres to the support.

The paper or textile webs thus covered with a resin layer may be worked in suitable rolling devices, such as are known in the industry of phenolformaldehyde resin laminated paper products, to rolled bodies of all kinds, as for instance tubes, bushings, etc.

What we claim is:—

1. In the process of making laminated rolled articles from sheet like material, the steps of coating the said sheet like material with an intermediate layer of a permanently fusible non-hardening amine resin containing not more than substantially 1 molecular proportion of formaldehyde for each molecular proportion of primary aromatic amine and selected from the group consisting of anhydroaminobenzylalcohol and its homologues and polymers, and uniting the layers by applying heat and pressure.

2. As new articles of manufacture, coherent laminated rolled products composed of superimposed layers of sheet material united together under heat and pressure by means of an intermediate layer of a binding agent comprising a permanently fusible non-hardening resin containing not more than substantially 1 molecular proportion of formaldehyde for each molecular proportion of primary aromatic amine and selected from the group consisting of anhydroaminobenzylalcohol and its homologues and polymers.

ALPHONSE GAMS.
KARL FREY.
THEODOR SUTTER.